July 23, 1963  L. H. FACER  3,098,737
PROCESSES FOR PRODUCING FERTILIZERS AND PRODUCTS THEREOF
Original Filed Feb. 25, 1942  9 Sheets-Sheet 1
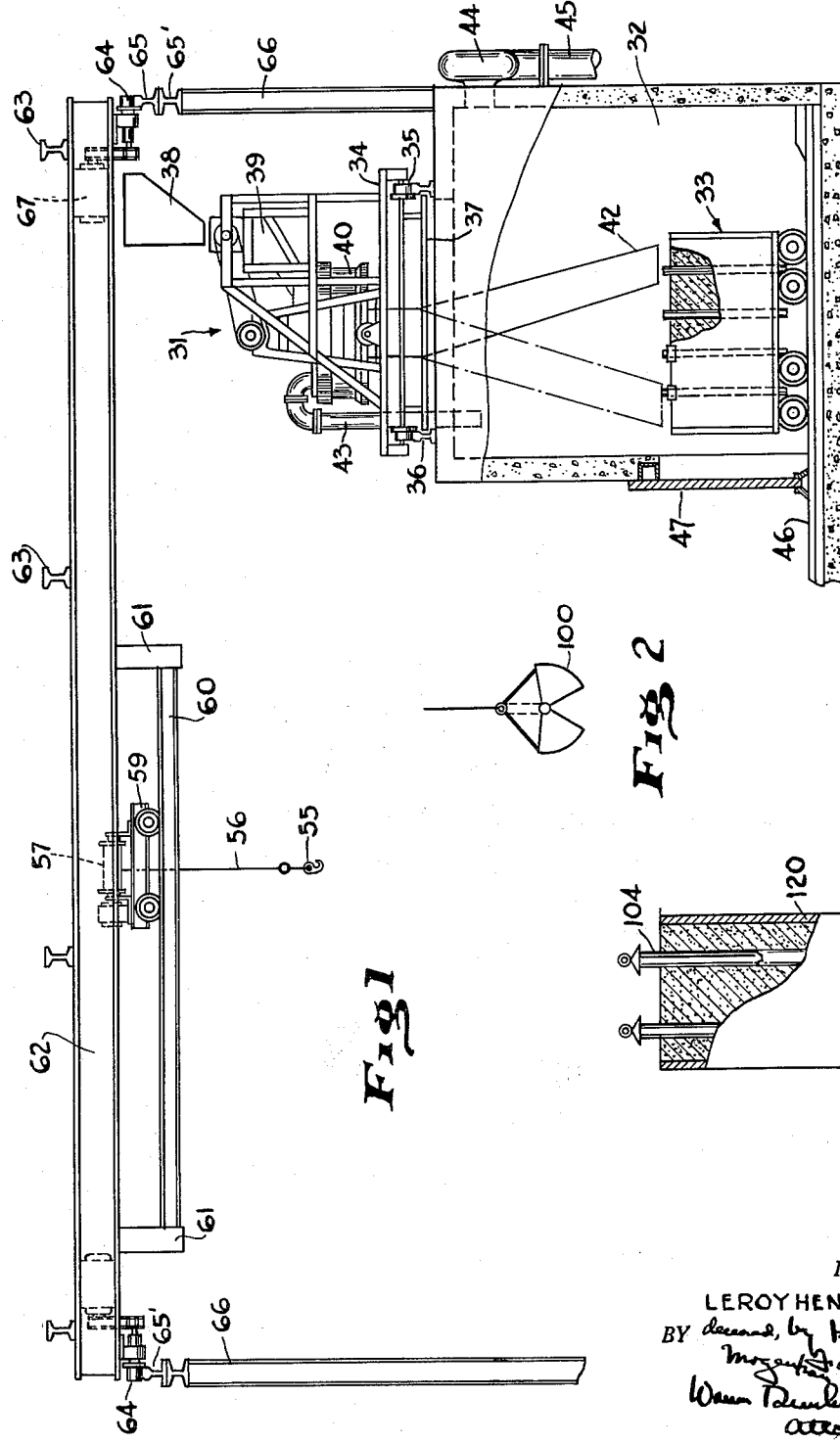
INVENTOR.
LEROY HENRY FACER

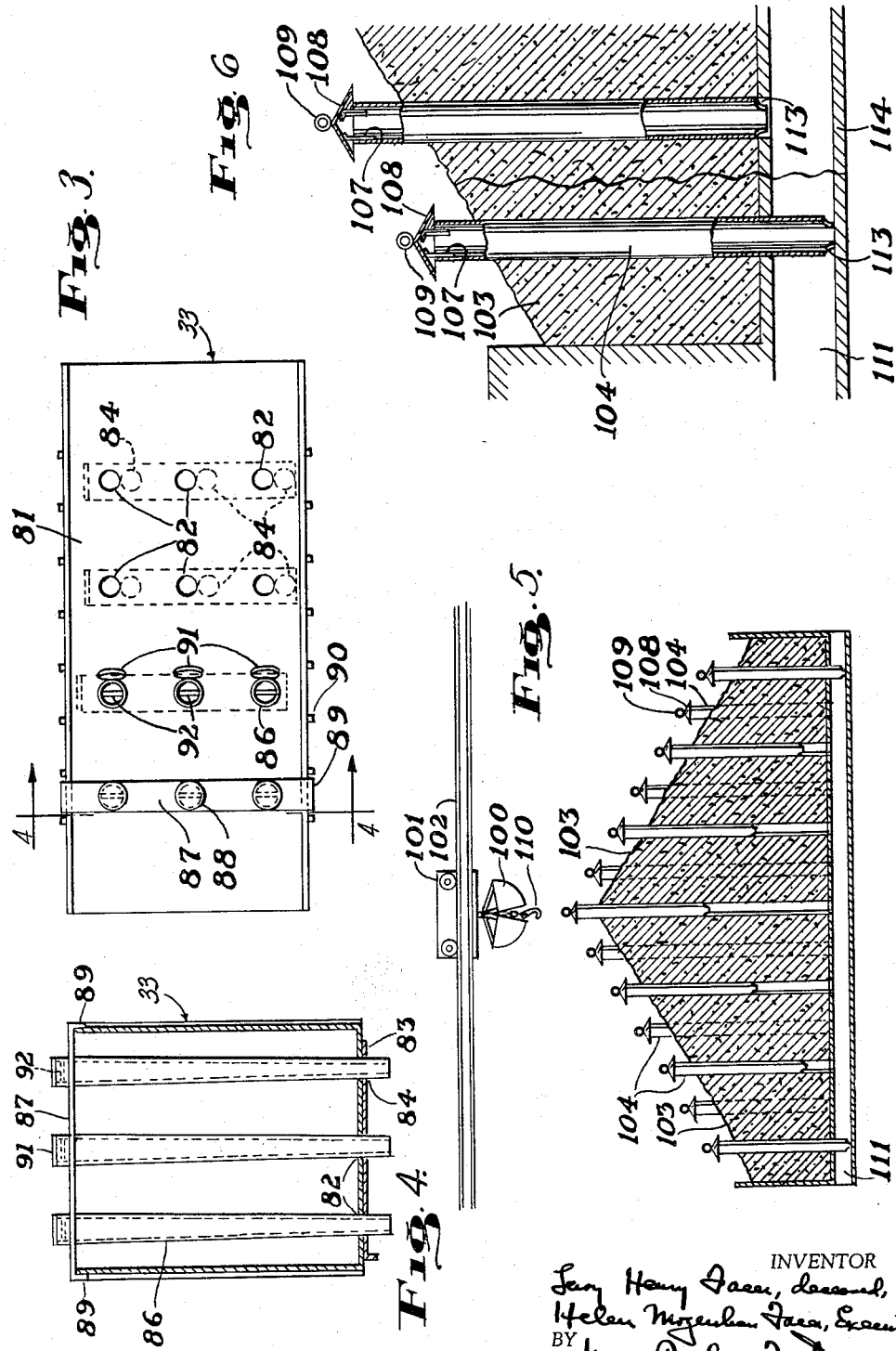

July 23, 1963 L. H. FACER 3,098,737
PROCESSES FOR PRODUCING FERTILIZERS AND PRODUCTS THEREOF
Original Filed Feb. 25, 1942 9 Sheets-Sheet 3

July 23, 1963 L. H. FACER 3,098,737
PROCESSES FOR PRODUCING FERTILIZERS AND PRODUCTS THEREOF
Original Filed Feb. 25, 1942 9 Sheets-Sheet 4

July 23, 1963 L. H. FACER 3,098,737
PROCESSES FOR PRODUCING FERTILIZERS AND PRODUCTS THEREOF
Original Filed Feb. 25, 1942 9 Sheets-Sheet 6

July 23, 1963 L. H. FACER 3,098,737
PROCESSES FOR PRODUCING FERTILIZERS AND PRODUCTS THEREOF
Original Filed Feb. 25, 1942 9 Sheets-Sheet 7

INVENTOR
Leroy Henry Facer, deceased, by
Helen Mozenham Facer, Executrix,
BY Warren Dunham Foster
ATTORNEY July 23, 1963 L. H. FACER 3,098,737
PROCESSES FOR PRODUCING FERTILIZERS AND PRODUCTS THEREOF
Original Filed Feb. 25, 1942 9 Sheets-Sheet 8

INVENTOR
Leroy Henry Facer, deceased, by
Helen Magoulas Facer, Executor
BY
ATTORNEY

United States Patent Office 3,098,737
Patented July 23, 1963

3,098,737
PROCESSES FOR PRODUCING FERTILIZERS AND PRODUCTS THEREOF
Leroy Henry Facer, deceased, late of Phelps, N.Y., by Helen Mogenhan Facer, executrix, Phelps, N.Y. assignor, by mesne assignments, to Glen E. Cooley, trustee, Schenectady, N.Y.
Original application Feb. 25, 1942, Ser. No. 432,350, now Patent No. 2,739,886, dated Mar. 27, 1956. Divided and this application Mar. 22, 1956, Ser. No. 573,118
15 Claims. (Cl. 71—37)

This invention is particularly useful in producing fertilizers containing phosphorus with or without other elements beneficial to the plant but in certain aspects it is applicable to the production of products not containing phosphorus. By "fertilizers" is meant any product which promotes plant growth including minor elements, metals, and hormones, as well as nitrogen, phosphorus and potash.

RELATION TO OTHER APPLICATIONS

This application is a division of prior application Serial Number 432,350, filed February 25, 1942, and appearing on March 27, 1956, as Patent Number 2,739,886. Said immediate parent patent is a continuation-in-part of applications Serial Number 338,987, filed June 5, 1940, Serial Number 242,121, filed November 23, 1958, Serial Number 206,291, filed May 5, 1938, and Serial Number 112,372, filed November 23, 1936, all of which were co-pending with said parent patent dated March 27, 1956, and all now abandoned. Said application Serial Number 112,372 is a continuation-in-part of application Serial Number 98,227, filed August 27, 1936, patented September 3, 1940, as Number 2,213,243, and of application Serial Number 709,411, patented November 24, 1938, as Number 2,061,567, and was co-pending with both of said patented applications. Said application Serial Number 98,227 also is a continuation-in-part of said application patented as Number 2,061,567 and was co-pending therewith. Said application Serial Number 338,987 is a continuation-in-part of said application Serial Number 112,372 and of said application patented as Number 2,213,243 and was co-pending with both thereof. Said application Serial Number 242,121 is a continuation-in-part of said application Serial Number 206,291 and was co-pending therewith. Said application Serial Number 206,291 in turn is a continuation-in-part of said application Serial Number 112,372 and said application patented as Number 2,213,243 and was copending with both thereof.

OBJECTS OF THIS INVENTION

In the application immediately parent hereto is described and claimed methods of producing pelleted superphosphate and superphosphatic fertilizers and such pelleted products so produced. A primary object of the present application is to disclose and claim methods for producing an improved fertilizer of granular or powdered form having the same chemical characteristics primarily by the application of positive steps to prevent dehydration and to assure substantially continuous cooling after the substantial completion of the primary reaction or primary period, as for example by positively ventilating a reacted mass during a large portion of the subsequent secondary reaction of the curing process and the great shortening of that curing process by such steps. The chemically superior product claimed herein per unit of plant food results in greater crop growth. Another object is the production of such a granular or even powdered end product which is dry and free flowing and does not cake and can be handled, shipped and applied to the soil with great facility.

The products of the invention as usable by the farmer and the processes of making them are distinctly different from the prior art, inter alia because of their high true water-solubility which so far as has been learned is critical in quantity and novel in quality. The truly water-soluble phosphorus-bearing product both while in the complex of a superphosphate or mixed fertilizer or when ready for sale or in the ground includes an acid salt or salts in which the hydrogen atoms remain in true combination with phosphorus (and when in solution the hydrogen ion is ready for combination to form other salts) with the result that fixation or change to a compound indigestible by plant life is avoided or long delayed. Discussion of the novel chemical results of the invention follows presentation of the methods hereof including ventilation by which the novel products are obtained.

A basic object hereof is to secure all of the above results with a lowered cost of manufacture, use of less labor, less acid in proportion to "available phosphoric acid" produced, less expensive materials and smaller quantities of certain materials and simpler and less expensive facilities, particularly for storage during cure, thus requiring less capital.

Another important object hereof is to produce a fertilizer product in which the change from water-extractable phosphate to water-inextractable phosphate is minimized, even though such phosphates are citrate-soluble. A more important object is to produce and maintain truly water-soluble phosphorus salts.

GENERAL DESCRIPTION OF PROCESS

To produce an improved superphosphatic fertilizer according to this invention one mixes ground phosphate rock and an acid, generally but not necessarily sulphuric, in a usual way, with or without then adding other fertilizer ingredients, and pour the resulting mixture into a den. The concentration and amount of the acid which is mixed with phosphate rock is sufficiently high to control the amount of water present to that required by complete reaction of the entire amount of ground phosphate rock used and to furnish the necessary water of crystallization to the end product after loss of water evaporated by the natural heat of reaction. After solidification one can remove this material from the den, disintegrate it and submit it to a step of controlled cooling, as in a ventilated pile. Alternatively, directly after the primary mixing the mixture is submitted to such a step, as by passing it into a ventilated pile. The word "pile," as used, means any mass of material of substantial size whether originally heaped up without closely confining sides and hence may be cone-shaped at the top, or whether discharged into a rectangular confining space, as for example a car with sides or another box-like structure. Whatever the shape of such a "pile" a cooling system is provided so that the heat of reaction is relatively quickly dissipated, dehydration is prevented and the curing process hastened. If one employs a den or utilizes one of the more recent continuous processes one adds other fertilizer ingredients, mixes them all before or after the sulphuric or other acid is added, and handles the resulting mixture in a ventilated pile as previously stated, or one may add the other ingredients to superphosphate after it has been mixed before it is piled or before it is removed from my ventilated pile.

No matter what method of handling is employed it is essential for the complete practice of this invention that after the primary mixing the temperature of the mass decreases substantially continuously and the product be not dehydrated and that the water necessary for crystallization be maintained available for the chemical reactions peculiar to the finished product. Any form of dehydration including, for example, heating after ex-denning or the completion of the primary mixing, is disadvantageous per se and is one form of dehydration which is destructive of the characteristic quality. Other forms of dehydration including application of a vacuum and drying as by an autoclave and otherwise and even continued aeration as by continued crane operations, long continued tumbling, or a long continued current of cool air causes destructive dehydration as does a shorter period of application of high heat.

After the primary mixing of acid and phosphate rock and disintegration one can add other fertilizer materials and mix the resulting combination, including the addition of ammonia salts. Conventional ammoniation is to be avoided since it destroys the characteristic crop-producing capacity of the end result but does not interfere with the economy and efficiency of the handling of the product or the physical desirability of the resulting granules or powder.

The finished product whether pelleted as in the parent application or granular or fine as produced by the different processes hereof, so far as is known is entirely unique in that it has substantially the same amount of total moisture—that is, free moisture plus water of crystallization—as appears in the freshly denned or freshly mixed materials respectively from which the product is made, less the loss by evaporation following the primary mixing.

Other advantages, objects and characteristics than those stated in the preceding and following portions of this specification are apparent from the following and preceding description, the attached drawings, and the subjoined claims. Although there are shown preferred embodiments of the invention and stating preferred products, methods and steps, it will be readily understood that I am not in any way limited thereto, as changes can be readily made without departing from the spirit of the invention or the scope of the broader claims.

DESCRIPTION OF DRAWINGS

In the drawings:

FIGURE 1 is a side elevational view, largely diagrammatic, partly broken away and partly in section, of a preferred form of the invention applied to a plant generally known as a crane plant.

FIGURE 2 is a fragmentary elevation of a bucket excavation by which a crane removes the contents of a den.

FIGURE 3 (Sheet 2) is a diagrammatic top plan view of a type of a ventilated car.

FIGURE 4 is a section along the line 4—4 of FIGURE 3.

FIGURE 5 is a diagrammatic illustration, partly in section, of the practice of the invention in a ventilated pile of large size.

FIGURE 6 is an enlarged detailed view, partly in broken section, of a portion of the subject matter of FIGURE 5.

FIGURE 7 (Sheet 1) is an elevation, partly broken away, of a "ventilated pile" of box form.

FIGURE 8 (Sheet 3): The superphosphate by ammonium molybdate;

FIGURE 9: A prepared standard mixture of monocalcium phosphate and calcium hypophosphite by ammonium molybdate;

FIGURES 10 (Sheet 3), 11 and 12 (Sheet 4): Three forms of conventional superphosphate by ammonium molybdate;

FIGURES 13 (Sheet 3), 14 and 15 (Sheet 4): Three forms of a prepared standard mixture of monocalcium phosphate, dicalcium phosphate and calcium pyrophosphate by ammonium molybdate;

FIGURE 16 (Sheet 5): The characteristic product by hexamine cobaltic chloride;

FIGURE 17: A prepared standard mixture of monocalcium phosphate and calcium hypophosphite by hexamine cobaltic chloride;

FIGURE 18: A prepared standard mixture of conventional superphosphate by hexamine cobaltic chloride;

FIGURE 19: A prepared standard mixture of monocalcium phosphate, dicalcium phosphate and calcium pyrophosphate by hexamine cobaltic chloride;

FIGURE 20 (Sheet 6): The product by ammonium chloride;

FIGURE 21: A prepared standard mixture of monocalcium phosphate and calcium hypophosphite by ammonium chloride;

FIGURE 22: Conventional superphosphate by ammonium chloride;

FIGURE 23: A prepared standard mixture of monocalcium phosphate, dicalcium phosphate and calcium pyrophosphate treated by ammonium chloride.

FIGURE 24 (Sheet 7) is a reproduction originally enlarged eight diameters of the product treated with ammonium molybdate and corresponds to the photomicrographs reproduced as FIGURE 8.

FIGURE 25 is of a prepared standard mixture of calcium hypophosphite and calcium monophosphate and corresponds to the microscopic photograph of FIGURE 9.

FIGURE 26 (Sheet 8) is a reproduction of a photomicrograph originally enlarged eight times of a water-extract of conventional superphosphate treated with ammonium molybdate and corresponds to the microscopic photographs reproduced as FIGURES 10, 11 and 12.

FIGURE 27 is similar to FIGURE 26 but is of a water-extract of a prepared standard mixture of monocalcium phosphate, dicalcium phosphate and pyrophosphate treated with ammonium molybdate and corresponds to the microscopic photographs reproduced as FIGURES 13, 14 and 15.

Figure 9:
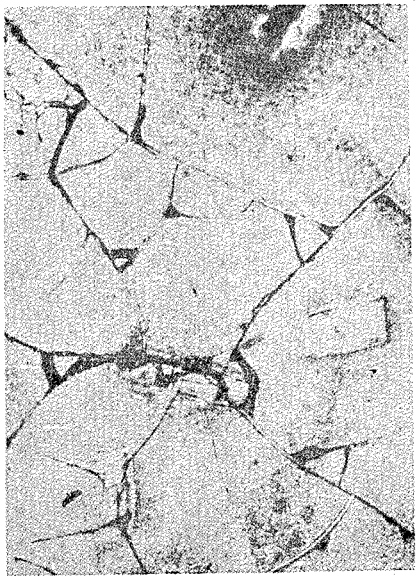
FIGURES 8 to 23, both inclusive, are reproductions of photomicrographs each originally enlarged approximately 125 diameters of crystals formed from water-extracts of the various substances stated immediately hereinbelow treated by various substances as specified below.

This invention will now be described in terms of certain apparatus by which it can be performed, although other desired and suitable mechanisms can be used. The invention is illustrated in a conventional crane plant, although any method of mixing phosphate rock and an acid and disintegrating the product of the primary reaction can be employed, provided the critical provisions hereof are observed.

FIGURE 1 shows a conventional mixing unit generally designated as 31 and a conventional den or filling room generally indicated as 32 which can be used whether the ventilated pile is stationary or movable. Rock and acid are mixed and discharged either into ventilated cars generally indicated at 33 placed within this filling room and illustrated in FIGURES 1, 3 and 4, or into the den itself. In the latter case after setting, the superphosphate is removed and disintegrated in any conventional manner and placed in ventilated piles as illustrated in FIGURES 5, 6 and 7.

This mixing unit 31 is mounted upon a platform 34 movable upon wheels 35 running on transverse rails 36 upon the top of filling room 32. Another similar den not shown is disposed in line therewith. After the mixing unit has filled the first den it is bodily moved to the top of the other den which in turn is filled while the contents of the first den are being removed. A lower structure 37 with surfaces cooperatively staggered in relation to those of the top of the filling room depends from platform 34 and as is conventional seals the den over which the mixing unit is disposed and prevents the escape of noxious gases during the filling operation and gives access to the mixture of rock and acid after the filling unit has been moved over the other den. Ground phosphate rock is introduced into a dust receiving hopper 38 and passes through a scale hopper 39 into a mixing pan 40 in which sulphuric or other acid such as phosphoric of desired concentration and proportions is mixed therewith. After mixing, the mass of acidulated rock is discharged from the pan into the filling room 32.

Within the limits of concentration and quantity relatively to the phosphate rock as previously stated exact concentration and proportions of the inorganic acid are determined by the characteristics of the rock, ambient humidity and temperature, and the type of product desired. As stated in the said parent patent the use of less acid in relation to rock than is conventional to secure the same or a greater degree of conversion. Ordinarily I employ about 850 pounds of sulphuric acid at 60° Baumé at 60° Fahrenheit, and diluted for use generally to 54° to 56° Baumé, with from 1150 to 1250 pounds of ground phosphate rock, the exact ratio depending upon the constituents of the rock and other variable conditions. The amount of water in the reactants should be limited to that necessary to allow for natural evaporation caused by the heat of reaction, and to provide water of crystallization while producing a sensibly dry product.

VENTILATED CAR: FIGURES 1, 3 AND 4

The form hereof illustrated in FIGURES 1, 3 and 4 for convenience is designated as that of a ventilated car. What is termed generically a "ventilated pile" is disposed in a car. In this form of this invention the acidulated rock passes through a movable funnel 42 into the one of the ventilated cars 33, later described, on track 46, in the filling room. The gas from the pan is withdrawn through a pipe 43 leading into the filling room which is exhausted by a fan 44 through outlet 45. As each car is filled, a doorway 47 is opened and the car is removed from the filling room under a crane structure and another placed in position.

A crane or its equivalent is necessary for the removal of the ventilating pipes from the superphosphate after curing has progressed to the proper point as well as to illustrate the form of the invention in which a ventilated stationary pile is used. A hook member 55 is attached to a cable 56 operated by an electric winch 57 powered by a motor 58 placed upon a car 59 upon a track 60. This track 60 depends by vertical supports 61 from lateral eye beams 62 joined by longitudinal eye beams 63. The carrier structure formed by the eye beams 62 and 63 operates upon wheels 64 on rails 65 supported by eye beams 65' mounted upon upright beams 66. Motors 67 move this entire crane structure in directions at right angles to the track 46. Car 59 is driven by a motor not shown.

As shown diagrammatically in FIGURES 3 and 4, in the ventilated car 33 ventilating openings are formed at such proximity to each other and the exterior of the car that the heat of the mass in each car is dissipated reasonably consistently. These openings preferably are placed so that no portion of the material is more than substantially two to three feet, for example, from either the outside of the car or one of the openings. To secure the peculiar crop-producing chemical quality the ventilation preferably should be such that the mass will cool to about 170° F. in about twenty-four hours. Tapered openings 82 in the bottom of the car are closed by a damper in the form of a metal sheet 83 slidable in a fixture underneath the car and having openings 84 which may be moved into alignment with the openings 82. Only when these two sets of openings are in alignment can air pass from the bottom of the car to the space therewithin. The lower ends of ventilating pipes 86, preferably tapered, are supported by these openings 82 and 84, when they are in alignment. The upper ends of the pipes extend slightly above the top of the car. A cross strap 87 with the openings 88 aligned with openings 82 for the reception of the pipes and with depending ears 89 engaging the sides of the car between lugs 90 thereon hold the pipes upright. A movable cover or cap 91 may be provided for each pipe. Rods 92 extending across the tops of the pipes therewithin form points of attachment as for the hook 55 by which the pipes can be raised and lowered.

The car with the pipes assembled therein is placed within a filling room 32, the caps 91 being closed. A mixture of phosphate rock and an acid or such a mixture including other ingredients, if desired, is then discharged into the car. After the first car is filled, it is then removed from the filling room and a second car with ventilating pipes in position placed therewithin. The pipes and straps 87 are then removed from the first car and placed in a third car awaiting use and the first car placed upon a storage track.

After the pipes 86 have been removed, the plates 83 may be moved to close the openings 82 to check the free flow of air through the passageways which follow removal of the pipes. Over-rapid cooling is to be avoided. Manipulation of these dampers permits optimum control of the rate of cooling, depending upon weather and other conditions. After about 24 hours, with placement of the ventilating tubes to secure the characteristic product, the mass will have cooled to below approximately 170°, whereat it may be disintegrated. This disintegration promptly cools the material still further, thus not disturbing the characteristic quality, as later set out. As a matter of convenience the superphosphate may be left in the car until needed. Within from five to ten days the small remaining conversion of the unavailable to "available" phosphate is completed to its commercial limit. Preferably at this time other wanted fertilizer materials can be added as in the manner taught in the parent application and in the said Patent Number 2,213,243 and the mixing and disintegration then completed. At least one of the end walls of the car may be removed for convenience in unloading and the bottom openings closed.

VENTILATED PILE: FIGURES 5, 6, AND 7

The method of ventilation applied to stationary piles is particulary useful in existing plants which have conventional mixing equipment and large storage space under cover. It is illustrated in FIGURES 5, 6 and 7.

Phosphate rock and acid can be mixed and poured in a conventional den such as 32 just described, and exdenned as by a bucket 100 (FIGURE 2) upon chain 56 operated from carriage 59 previously described which runs upon track 60 adjacent the top of a storage space, or from a carriage 101, as shown in FIGURE 5, which runs upon a track 102 adjacent the top of a storage space, and placed in a large pile 103, as is now practiced in the superphosphate art. The showing of this method of mixing and ex-denning is only as illustrative since in the practice of the invention any desired and conventional method, such for example as the Wenk or Sturtevant, can be used for mixing, disintegrating and conveying the superphosphate, or continuous mixers may be used, always provided however that from the point of acidulation and ex-denning (which includes disintegration as understood in this art) it is handled as herein stipulated.

Within this storage space, a large number of pipes 104 previously have been placed, preferably staggered as shown in FIGURES 6 and 7, sufficiently close to each other so that all parts of the ex-denned superphosphate when piled about the pipes are sufficiently close to the ventilating openings so formed that the heat after ex-denning is carried off promptly, thereby preventing dehydration, and cooling relatively rapidly. In practice it has been found that the peripheries of each of the ventilating openings may well be within about four feet of each other. The distance of four feet is merely illustrative since the size of the pipes and the end product to be obtained must be considered.

The objective of the ventilated pile is to provide heat exchange during curing, to cool the mass and prevent dehydration. This objective may be achieved through the use of spaced openings, as described above. If small openings are employed, they should be disposed on close center-to-center spacings. If large openings are employed, correspondingly larger center-to-center spacings may be employed, up to a practical limit of about five feet. As may be seen the plurality of spaced continuous passages extend a substantial distance through the pile to provide efficient cooling without dehydration during the secondary period.

In a preferred embodiment of the invention, the openings are desirably of a cross-sectional area of approximately 32 square inches, on center-to-center spacings of about three feet.

Each one of these ventilating pipes can be formed by placement of an ordinary iron or steel pipe, for illustration only from six inches to one foot in diameter. To the upper end of each pipe is attached as by rods 107 a protective bonnet 108 the edges of which project over the opening. An eye 109 in the bonnet receives a hook such as 55 or 110 attached to a crane so that the pipe structure can be raised and lowered. Air ducts or inlets 111 with openings slightly larger than the circumference of the pipes are positioned below the pipes. The pipes, during the first of the piling operation, pass through these openings and are braced thereby against sideward movement. Depending legs 113 hold the pipes spaced from the floor 114.

The ex-denned material is dumped about the pipes 104, bonnets 108 preventing the material from falling inside of the pipes. When the superphosphate has built up to a point reasonably close to the top of any pipe, it is moved upwardly, its lower portion remaining supported by the mass. By this time the material piled about the pipe in its former location will be sufficiently solid to hold its form. The result is an air passage leading from the inlet 111 to the top of the pile and including a passageway formed in part by the material itself and in part by the pipe. As the pile is gradually built up, this process is continued until the pile is complete. Then the pipes may be removed and used for another pile.

The removal of the pipes, whether from the ventilated car previously described herein or from the above described mass, is largely a matter of convenience in excavating, since the heat of the mass is readily dissipated through the iron of the pipes.

The superphosphate may remain undisturbed in these piles until it is cured or may be removed from the pile when the temperature reaches about 170° F. The air passages formed by the material itself are sufficient to prevent reheating. If desired, air may be forced into the passage 111, but generally convection alone will be sufficient. Moreover, in practice it has been found that the air inlet 111 is not necessary, since in the pipes themselves a downward current is promptly set up along with the rising current.

As is known to those skilled in the art, superphosphate which is placed in large curing piles is often aerated by repeated re-piling, as by a crane. This expensive and harmful process is entirely eliminated by this method and a superior physical and crop-producing product is secured. This crane method of aeration does not prevent reheating with its attendant evils, but merely cools the product after it has reheated and places it back again into other piles which in turn reheat. Aeration in itself is deleterious since it causes dehydration. Such crane movements therefore prevent the creation of the peculiar quality or destroy it.

In certain plants a relatively small laterally enclosed space can be formed, such as the box 120 shown in FIGURE 7, for example, place ventilating pipes such as 104 therein, and drop the mixture from the crane bucket 100 directly about these pipes. Then the pipes can be raised as previously described.

The process of the invention can be more clearly understood by reference to the following demonstration thereof, in which the novel and superior fertilizer product is obtained:

Example 1

850 lbs. of sulphuric acid of 60° Baumé at 60° F. were diluted to 56° Baumé. The temperature rose to about 120° F. on dilution. The dilute acid was mixed with 1200 lbs. of ground phosphate rock, 68 B.P.L. About 98% to 98½% of the total phosphoric acid became converted to available form in the completely cured product.

Prior to mixing the reactants, means for positively cooling a pile was constructed. Over a storage floor, wooden boxes were disposed in parallel rows on 36" centers. Each box had outside dimensions of 12" by 16" and inside dimensions of 8" by 12". The boxes were several feet longer than the length or width of the pile of the reaction mixture of rock and acid was intended to be, and were placed horizontally on the floor. The boxes were each placed on a twelve inch side. On the exposed upper box length, openings about 16" long were provided on 36" centers.

Upright wooden ventilating tubes about 8' long were provided. The tubes were mutually braced to maintain them in upright position. The top opening of each tube was closed simply, with a board.

After conventional mixing of the rock and acid, the mixture was placed in a den. After the customary denning period of a few hours, the material was excavated and placed in the ventilated storage space by a conventional crane. The bottom of the pile set sufficiently within a short time to be self-sustaining. Consequently, the upright tubes were raised gradually as the height of the plie increased. Eventually, the tubes were removed completely after a sufficiently deep pile was obtained. This left a pile having air passages in regular rows, spaced apart within each row on three foot centers.

The natural circulation of air through these passages proved sufficient to dissipate heat from the entire mass quite rapidly. Overheating was avoided, and after twenty-four hours of reaction, the temperature of the material was below 170° F. The decrease in temperature after piling was observed to be continuous and consistent.

The piled material was excavated, bagged, and shipped after ten days. The product was of excellent granular characteristics and had a high degree of water-extractability and water-solubility.

In another demonstration of the invention, the material was placed directly in the ventilated car after mixing. Good results were obtained. This procedure had the advantage that denning was eliminated.

In a further demonstration of the invention, the mixed rock and acid was placed in a confining receptacle in layers of not less than three inches nor more than three feet. This caused an increase in the temperature of the mixture and prevented the ready escape of gases and water vapors, in the primary reaction when heat and gas pressure are advantageous. After setting, the mass was disintegrated and then placed in a ventilated pile, where on the contrary, rapid cooling is essential. Alternatively, the mixed rock and acid may be placed directly in a ventilated pile in layers of not less than three inches nor more than three feet, where air circulation in the pile is restricted to avoid cooling and to cause an increase in the temperature of the pile. After the primary reaction has been completed, and after full advantage has been taken of the heat generation and gas pressure during the primary reaction, air circulation and cooling must be permitted. In this alternative procedure, ex-denning was avoided.

In the practice of the invention, limited amounts of phosphoric acid may be substituted for a portion of the sulphuric acid. In general, the use of sulphuric acid alone is preferred. However, where it is desired to increase the fertilizer content of the product for some reason, up to about one third of the sulphuric acid may be substituted by phosphoric acid. In any case, the concentration of the acid should be controlled so that the total amount of moisture present in the mixture of ground rock and acid is just sufficient provide the amount of water lost by evaporation, the water of crystallization of the product, and to produce a sensibly dry product. In most cases this requires a sulphuric acid concentration of at least 50° Baumé. Usually, best results are obtained when the concentration of sulphuric acid is about 56° Baumé.

pH OF PRODUCT

Figure 28:
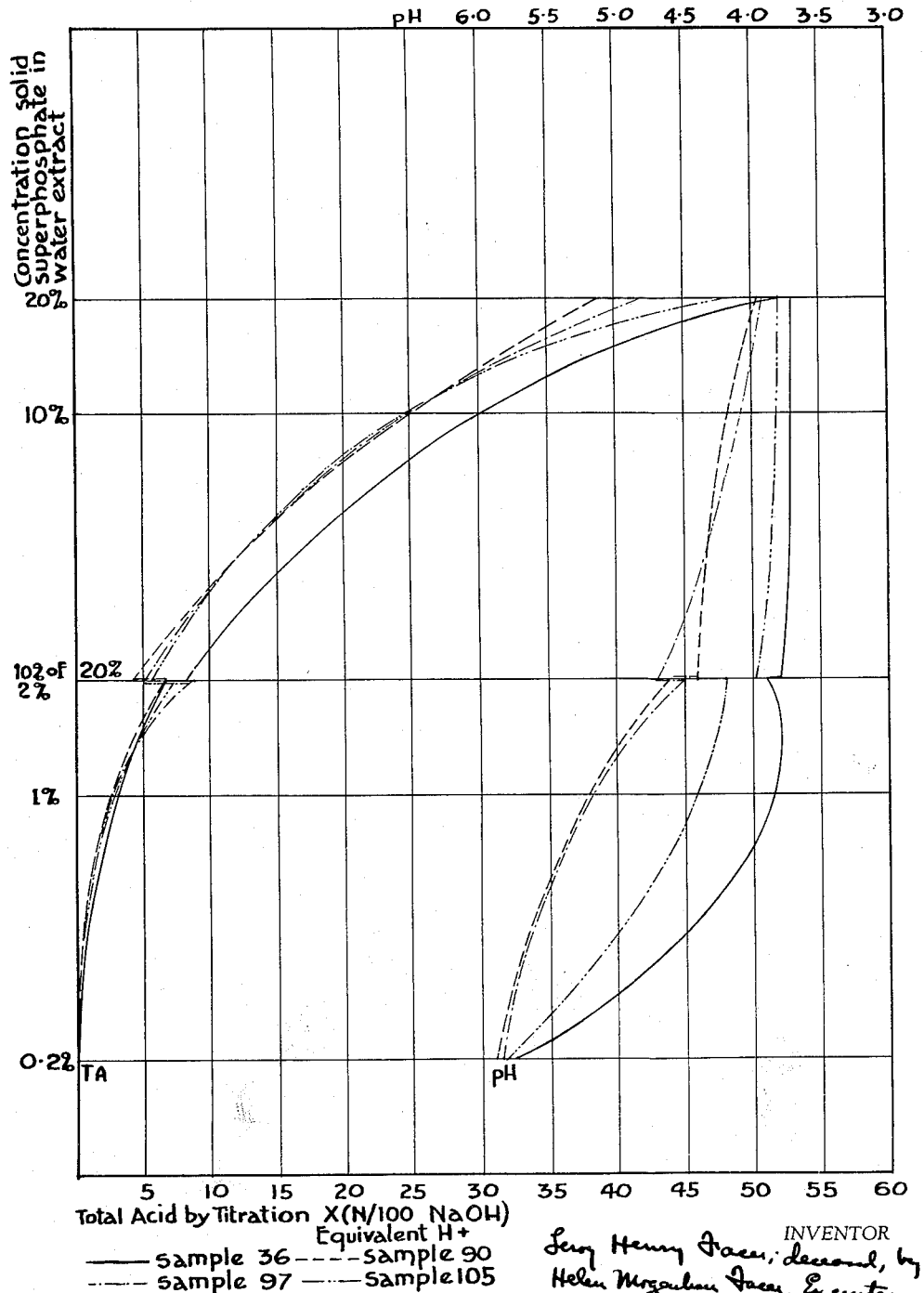
FIGURE 28 (Sheet 9) is a graph showing curves representing total acid content by titration (lower scale) and acid concentration (pH) (upper scale) of the product and three typical superphosphates at various dilutions.

Although the product as shown by titration with a normal base solution has a total acid content comparable to the mean acid content of competitor materials (that is, it has no substantially greater amount of "acid") it does have a substantially greater instantaneous hydrogen ion concentration at all dilutions and therefore a greater ability to form soluble and other valuable salts (see FIGURE 28). The pH value of the typical product differs in accordance with the rock-acid ratio which is employed and other details of manufacture, but on the basis of many hundreds of pH determinations can be said to average in the finished product definitely below the corresponding figure for conventional superphosphate. The numerical value of the hydrogen ion concentration of the product, therefore, is lower than that of typical commercial phosphates. That is to say, its average hydrogen ion concentration is much greater than is that of conventional superphosphates. Hydrogen ion concentration is of course limited to the instantly available acidity and is measured by any recognized method of pH determination. On the contrary the total acidity of the product as determined by titration against a standard base is comparable to the mean of the total acidities of competitive products. Although the product is not intrinsically over-acid as compared with conventional superphosphate, it does have instantly available at all times and in all dilutions a relatively greater quantity of hydrogen ions. This characteristic makes possible the conditions favorable to the formation of soluble phosphatic salts without the presence of an actual excess of acid.

The net result of the foregoing is that the phosphate radical of the product in all dilutions remains in solution and the formation of soluble salts (or other valuable salts as later stated) by combination with materials and minor elements present in the soil is promoted, therefore making both the phosphorus and the metals usable by the plant. That is to say, this radical is not subject to spontaneous decomposition, as is that of monocalcium phosphate, for example, but remains in solution without decomposition as long as no other compound is added to induce double decomposition. When such other compound is added, the product is ready by such double decomposition to form the various substances herein indicated which can be used by the plant.

This feature of this invention will be clear by a consideration of FIGURE 28. This chart shows a comparison of four samples. The curves at the right represent pH values and are plotted against a top or pH scale while the left-hand curves represent titration and are plotted against the bottom sodium hydroxide titration scale, both sets of curves being coordinately plotted against dilution on the vertical scale. The three conventional samples chosen for comparison were selected in an effort to secure specimens which are closely related to that of this product, identified as sample 36.

Sample 105 is a partially curved conventional run-of-pile superphosphate which theoretically considered should represent the closest approach to the product of an intermediate substance not intended for direct use by a consumer. Samples 90 and 97, produced respectively in Baltimore, Maryland, and in Tampa, Florida, by different manufacturers, represent conventional 20% superphosphate ready for sale.

Water-extracts of these four samples were titrated and measured for hydrogen ion concentration in dilutions of the following order: 0.2%, 1%, 2%, 10% of 20%, 10% and 20%. It will be noted that the 10% extraction of the 20% extraction produces a 2% solution which in all measurements differs somewhat from the direct 2% extraction.

The continuity of the curve indicates the direction of coordination in these two dilutions. It will be noticed that at dilutions from 0.2% to 2% the total amount of hydrogen ion content (total acid) in all four samples is closely similar. The amount of instantaneously available hydrogen ion or free hydrogen ion concentration, however, is much greater in the case of sample 36, which is this product, than of the other samples. This difference reaches a maximum at 1% in which sample 36 has a pH of 3.85. The nearest competitor, sample 105, run-of-pile, has a pH of 4.2 and the two remaining samples, 90 and 97, curved and standardized superphosphates, a pH of 5.2 indicating that the logarithmic instantaneous hydrogen ion value of the product is 1.4 or 12½ times the amount of available hydrogen ion as compared with the two more remote samples 90 and 97. The 10% extracts shows this product exceeding its closest competitor sample 105 by 13% and the mean of the two more remote samples by 30%. At 10% extraction this product contains .3 unit of hydrogen ion as compared with .25 of the three competitive samples or an increase of 20% in the total hydrogen ion content. At a 20% extraction the product has 20% more available hydrogen ion and has a .52 hydrogen ion units as against .48 hydrogen ion units of the nearest competitor.

The above discussion compares this product and conventional products at the same dilution of similar water-extracts. It is of course true that owing to the greater water-extractability of this product, sample 36 contains greater amounts of phosphorus, although not to the usual extent because these samples were chosen as most closely approaching this product. All differences if any in these respects caused by these differing amounts of water-extractable phosphorus are paralleled in the soil, provided equal amounts of the product and the competitive are used. Since it is recommended and many farmers used only one-half as much of the product, defined in conventional terms of phosphorus, as of competitive products, it is interesting to compare hydrogen ion concentration at twice the dilution of the conventional.

Sample 36 in 1% extraction has a pH of 3.85. At 2%, two prepared superphosphate samples 90 and 97 as sold to the farmer have a mean of 4.55 or a difference of .7 of a pH unit in favor of the product which is equivalent to a 500% greater hydrogen ion availability. A typical commercial run-of-pile superphosphate, sample 105, as a pH of 4.1 or (considering the above concentration of 3.85 in a 1% extraction) a difference in favor of this product of 0.25 corresponding to 144% more available hydrogen ion in the 1% of the product than in the 2% run-of-pile.

A study of the graph of FIGURE 28 shows significant differences in instantaneously available hydrogen ions ranging from 130% at 9.2% extraction to 1010% at 1% extraction. It is obvious that if samples of conventional superphosphate of relatively low water-extractability were chosen for comparison the excess in favor of this product of instantaneously available hydrogen ions would be tremendously increased.

In connection with consideration of this phase of the invention, comparison may be made with the titration curve of phosphoric acid, Clark, "The Determination of Hydrogen Ions," Second Edition, Williams and Wilkins Company, Baltimore, 1922, page 41, FIGURE 5.

It will of course be recognized that the disproportionately large hydrogen ion concentration as compared with the total hydrogen ion content (total acidity) of the product reflects a difference between a highly ionized solution of a salt, as is the case with the product, and a buffered solution of an acid, as is the case of the conventional superphosphate. Ordinarily monocalcium phosphate spontaneously decomposes and forms dicalcium phosphate and phosphoric acid and eventually tricalcium phosphate and phosphoric acid. In both cases the acid, which has the low ionization constant of all weak acids, has its ionization constant still further lowered by the buffering action of dicalcium (and tricalcium) salts present.

This buffering action suppresses the hydrogen concentration to a large degree. The product lacks this buffer repression so that it, while having a normal hydrogen content, has the combining characteristics of a solution of greater hydrogen concentration (lower numerical pH value). It will therefore be recognized that the above phenomenon as applied to the product is not one of buffering.

It therefore appears that an essential and highly important as well as novel factor of the product lies in the retention of the hydrogen atom within the phosphorus radical and the maintenance in the fertilizers and in the soil of a truly soluble acid phosphatic salt for a relatively long period of time.

WATER-SOLUBILITY

Understanding of the process claimed herein, including the positive step of ventilation, and of the different process claimed in the parent patent, including pelleting and coating, demands exact use of the terms "water-soluble" and "water-solubility," on the one hand, between which "water-extractable" and "water-extractability" on the other hand, distinction must be made. Any substance which in whole or in part disappears when mixed with water in varying quantities has been loosely called "water-soluble" whether resulting from simple solution or decomposition. Herein the terms "water-soluble" and "solubility" are used in the meaning commonly accepted by scientists and not in the common loose use of the fertilizer industry. Herein "water-extractability" includes the capacity of a solid substance to have certain or all of its parts removed therefrom by and to disappear in water whether or not the resulting liquid, which is termed a "water-extract," is a pure solution of the original solute.

A truly water-soluble fertilizer of calcium in combination with phosphorus and mixed fertilizers made therefrom have much greater crop-producing capacity than phosphatic fertilizers which are merely water-extractable because the latter when decomposed in water yield a phosphatic anion which combines with basic elements in the soil to form chemically stable compounds which resist assimilation by plants. The combination of anions from truly water-soluble calcium phosphates with basic elements forms a product generally readily and truly water-soluble and easily assimilable. The product in soil water yields an acid salt or salts in which the hydrogen atoms remain in true combination with phosphorus. Thus fixation or change to an indigestible compound is avoided or long delayed.

UNCERTAINTIES CONCERNING SUPERPHOSPHATES

The chemistry of superphosphates and superphosphatic fertilizers and that of the phosphate rock generally used as its basis are complex and relatively little understood. In general chemistry with the exception of the few compounds which have been carefully purified for analytic and research work the available compounds of phosphorus including phosphoric acid are mixtures of many phosphatic compounds. Anlyses of phosphate rock and superphosphate state the phosphorus present as an arbitrary and familiar phosphatic radical usually $PO_4$ or $P_2O_5$ which does not indicate the presence of that radical in the quantity stated or at all. Similarly metallic salts in phosphate rock are ordinarily reported as metallic oxides when in reality they are metallic phosphates or sulphides. This convention ordinarily is not objectionable, but with the novel product is confusing.

Nevertheless the characteristic and novel product is defined in definite terms—chemical, electro-chemical, physical and optical—which result in its ready identification as well as an understanding of the steps by which it is obtained. While many factors in both product and process are not yet fully understood, this specification enables anyone skilled in this art without experimentation completely to practice this invention.

In this industry it is assumed that the phosphorus content of superphosphate is monocalcium phosphate, dicalcium phosphate and tricalcium phosphate and that monocalcium phosphate is "soluble in water" (as it is not), dicalcium phosphate is "insoluble in water" but "soluble in weak acid" and tricalcium phosphate is practically speaking "insoluble." Such assumptions while convenient in this industry are contrary to scientific fact; see for example "Properties of Inorganic Substances," by Wilhelm Segerblom, The Chemical Catalog Company, Inc., 1927.

IMPORTANCE OF WATER-SOLUBILITY

Agronomists have long recognized that only a small portion of the phosphorus in commercial fertilizers is actually utilized by the plant, although a large portion of the nitrogen and potash is utilized. A plant ordinarily secures only between ten percent (an average of good farming practice) and twenty percent (which is exceptional) of all phosphorus properly applied in good commercial fertilizers.

Tests of the product have shown that per unit of phosphorus applied, increases in plant growth have run from 10% to 300%. Such figures reflect increases in actual plant utilization, over the present utilization (of from 10% to 20%), per unit of so-called "available phosphorus applied. Therefore, when the new product is substituted for conventional fertilizers, it has been found that one unit of phosphorus content, as indicated by conventional analysis, produces the same or greater plant response than two units of phosphorus content in conventional products, depending on the specific plant and soil conditions. For example, a truck grower previously using 1000 pounds per acre of a 4–8–4 fertilizer may well substitute 500 pounds of 8–8–8, the necessary phosphorus content being amply supplied by this product. On many soils and with many crops, this procedure has resulted in greatly improved crop yields.

When monocalcium phosphate, which is water-soluble only to about two-tenths of one percent and is an acid salt, is placed in ordinary American soils, the phosphorus therein is decomposed by soil water and cannot readily be used. Dicalcium phosphate in the soil is water-soluble to about two one-hundredths of one percent and is largely stable and neutral and does not so combine, but the plant can utilize its phosphorous content only after digestion by its acids. Tricalcium phosphate, although an alkaline salt and truly water-soluble from two to three one-thousandths of one percent, is not soluble in the weak acids of the soil and hence is of no practical value to the plant except over a long period. In all of these decompositions, including monocalcium phosphate in large part, whatever phosphoric acid is liberated ordinarily combines with metals or bases there present and forms other phosphates which are water-insoluble and not readily digestible by the plant.

When monocalcium phosphate is placed in water, a solution results, but it is not pure and is not a solution of monocalcium phosphate. Instead, the decomposition of the monocalcium phosphate results in a solution of monocalcium phosphate, dicalcium phospate, tricalcium phosphate and phosphoric acid.

If a water-extract of ordinary superphosphate is evaporated, the resulting substance will be different from the original. A portion of the fraction of my product which resembles conventional will re-crystallize in the conventional manner.

The chemical identity of the new product is not completely known. However, a large number of identifying characteristics of the product have been established and certain surprising characteristics have been observed. For example the characteristic product will re-crystallize from a water-solution whereas conventional products will not.

When the product is placed in the soil its essential constituents go into a true water-solution and combine, apparently through double decomposition with substances there present, to form other salts which are in turn water-soluble and usable by the plant. So far no previous practitioners have been able to maintain such in an end product as used by the farmer. An analogous process occurs in the manufacturing operation.

The reaction between sulphuric acid and phosphate rock appears to produce largely water-extractable phosphate which under the processes of others in this country later becomes in part citrate-soluble. In contrast to other processes, the process of the invention retains as water-extractable a relatively very large percentage of the water-extractable salts originally produced, generally well over 90%, without over-acidulation and an undue amount of free acid or the creation of a product which is gummy, sticky and otherwise difficult to handle. So far, however, no one has previously produced in condition for use and sale a fertilizer which includes, except to a negligible extent, phosphorus which is truly water-soluble, as distinct from water-extractable.

Many different analyses of the products as made at different times, in different places, under varying conditions, taken from samples aged one, three and five weeks and eighteen months with rock of different B.P.L. have all shown substantially ninety percent of the total available phosphorus to be in water-extractable form. In conventional superphosphate, the water-extractable phosphorus tends continually to degenerate into a water-inextractable form.

A ratio of water-extractable to total phosphorus of at least eighty-five is secured in the cured product made of a stoichiometric mixture. If the ratio exceeds that of a stoichiometric mixture the ratio of water-extractable to total phosphorus remains at least eighty-five. With relatively more rock and less acid the product cured in accordance herewith still secures a ratio in percent of water-extractable to available phosphorus of at least eighty-five. That is, with under-acidulation less water-extractable and less available phosphorus is secured but equally well maintain the ratio between them. All fertilizer manufacturers try to avoid "reversion" or "retrogradation" of available phosphoric acid to insoluble phosphoric acid. Such reversion and also that of water-extractable phosphate to even citrate-soluble form is also avoided.

If a fertilizer manufacturer wishes to do nothing more than avoid "reversion," as a substitute for the repeated crane movements and other expensive and inefficient chemical practices, and is willing to forego the novel crop-producing component he may make use of the novel system, with the pipes placed farther apart. Such practice may be particularly valuable when before the piling other fertilizer materials are added to the mass which set up a reaction causing heat which if not removed would be deleterious.

DETECTION OF THE NOVEL PRODUCT

Since the novel and differentiating qualities of the product and steps to create and maintain it are clearly and precisely stated herein its exact composition is of secondary importance.

The generally known phosphoric salts of calcium include the three ortho phosphates, the tri-, di- and mono-calcium phosphates, and also the pyrophosphates, the family of metaphosphates and its polymers, and hypophosphites, and the phosphites. The monophosphates are soluble in water only to about 0.2% but decompose therein. None of the other salts is water-soluble or water-extractable to 0.1% or more with the exception of hypophosphite and phosphite although dicalcium phosphate very slowly decomposes. The majority of metallic salts derived from calcium hypophosphite are authoritatively recognized as water-soluble. Since the product alone and in combination with many metals has been shown in hundreds of tests to be truly water-soluble and to retain the hydrogen atom within the radical, hypophosphite is related to the novel product or it has qualities closely corresponding thereto.

Commercial phosphoric acid and commercial phosphates made by the acidulation of natural phosphate rock are known to be mixtures of many phosphatic materials. Also conventionally made superphosphates are mixtures of ortho- and non-ortho-phosphates with ortho-forms predominating and with the latter largely neutral. In commercial superphosphate the predominant ortho-phosphatic form is monocalcium phosphate or dicalcium phosphate. Since my product is made from the same materials as is the conventional and contains a considerable amount of an ortho-phosphate it is likely that whatever ortho-phosphate is present is predominatingly of the monocalcium type since it is water-extractable.

Further indication of the chemical identity of the novel product is found by a water extraction of the product. On re-crystallization from the extract, crystal analysis reveals that the substance obtained is identical with a prepared standard obtained by mixing two parts of calcium hypophosphite and five parts of monocalcium phosphate, dissolving the mixture in water, and recrystallizing.

Ordinarily inorganic chemical analysis is based upon reducing the constituents of an unknown compound to their elementary condition or converting them into some standard substance which can then be measured. Such analysis, however, may not reveal the characteristic ions present in the unknown substance where that substance decomposes upon solution, as do some phosphorus salts. A satisfactory identification of crystalling materials may be obtained through an identification of their peculiar crystalline formation. Crystallographic analysis is based upon the fact that any compound which will crystallize always does so with invariable precision of an order of accuracy comparable to that familiar in spectroscopy. Although variations of environment will produce variations in the apparent crystal form, the measurements familiar to all crystallographers remain characteristically precise and specific.

When the substance to be identified is a complex and not found in any authoritative index it may be separated into its significant ions by chemical reaction. Specific reagents when mixed with the material under test will produce specific identifiable reactions. The conditions under which crystallization takes place modify the size and dimensions of the crystal but do not change the specific factors which are the basis of identification by the crystallographer. The crystal identified by the above procedure is not a crystal of the original material but one of which one significant part comes definitely from the laboratory reagent and the other part the presence of which is suspected and is proved when the crystal assumes the expected form.

The technique which has been followed in identifying the new product is described by "Handbook of Chemical Microscopy" by Chamot and Mason, John Wiley and Sons, New York, 1940.

CRYSTALLOGRAPHY APPLIED TO THIS INVENTION

Application of the above technique to the product is shown by FIGURES 8 to 23, both inclusive. Analyses of crystals formed from water-extracts of the product and of typical conventional superphosphate were made. These findings were then employed as bases for the preparation of corroborative standards from chemically pure materials.

There follows a description of three characteristic tests of a crystal in terms of crystal habit, sequential characteristics from fluid to solid, and confirmation by use of three distinct reagents.

The crystals which are illustrated in FIGURES 8 to 23 and others as indicated were made from water-extracts of the following substances:

(1) Superphosphate prepared according to this invention.

(2) A standard comprising a mixture of calcium hypophosphite N.F. and monocalcium orthophosphate of the order of two parts by weight to five parts by weight.

(3) A typical conventional superphosphate.

(4) A standard comprising a filtered aqueous extract of a mixture made by mixing four parts by weight of a chemically pure calcium monophosphate and one part by weight of equal parts of chemically pure dicalcium phosphate and chemically pure calcium pyro-phosphate.

The standard prepared mixtures numbers 2 and 4 were chosen because a preliminary crystallographic analysis of the superphosphates indicated the presence of their significant components. An analysis of the product indicated the presence therein of a complex salt apparently derived from or including calcium hypophosphite and monocalcium phosphate. An analysis of several typical conventional superphosphates showed a relative wide variation in their components, but many were found to contain calcium pyrophosphate and dicalcium phosphate in addition to monocalcium phosphate. Therefore these two materials were used in making the comparison standard against which the conventional superphosphate was checked. Calcium hypophosphite, National Formulary, was used since it represented the most chemically pure material available.

Each standard prepared extract was given an acid reaction similar to the corresponding water-extract of the superphosphates and thereupon treated with the three following recognized micro-reagents:

(1) Ammonium molybdate.
(2) Hexamine cobaltic chloride.
(3) Ammonium chloride.

In addition to this crystallographic data the following confirmatory crystallographic characteristics were observed:

I. Typical interfacial angles;
II. The $a$-$b$ axial angles;
III. $a$-$c$ axial angles;
IV. $b$-$c$ axial angles;
V. Angle of extinction of birefringent crystals;
VI. Index of refraction.

Three major axes of any one crystal stated in degrees, minutes and fractions of minutes of arc are invariable. When a perfect junction of crystal faces can be seen, as is often true, the interfacial angle is characteristic. Thus in primary examination five specific and characteristic angles, with an almost infinite number of commutations having recognizable values, are visible. Two crystals of different compounds rarely have three angles within five degrees of each other. In addition each crystal has a definite and measurable index of refraction. Often the index of refraction changes with the direction of light travel through a crystal thus giving rise to definite phenomena when viewed under polarized light. For example, a crystal under a certain angle of polarization becomes practically invisible. This angle is the angle of extinction, which for a given compound is specific and precise. All of these tests were made to determine the identifying characteristics of the product.

Figure 8:
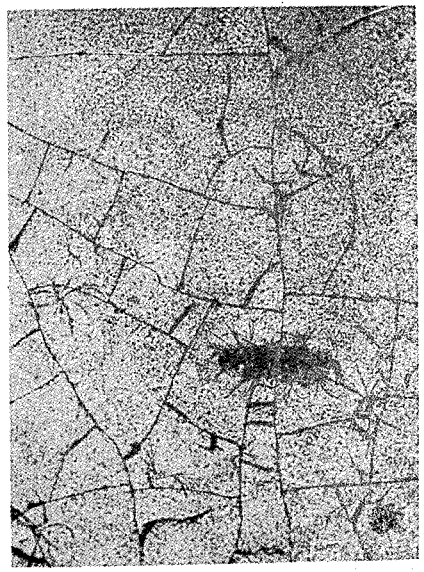

As illustrated in FIGURE 8 the above extract of the superphosphate treated by ammonium molybdate yields an evaporated residue which macroscopically is pale greenish yellow transparent amorphous and presents a glassy surface which is characterized by irregular spontaneous cracks. Microscopically, the structure consists of a glassy superficial layer, characterized by irregular spontaneous cracks, superimposed upon a stratum of strongly anisotropic minute crystals.

As illustrated in FIGURE 9 a prepared standard from an extract of a mixture of monocalcium phosphate and calcium hypophosphite in the proportion of two parts of hypophosphite in five parts of monophosphate macroscopically presents the same appearance as the substance shown in FIGURE 8—greenish yellow transparent glassy and amorphous. Microscopically there is the same glassy superficial amorphous layer covering a layer of minute anisotropic highly birefringent crystals interspersed with isolated large anisotropic crystals. These larger individual crystals represent the only significant difference between the specimens of FIGURES 8 and 9.

Figure 10:
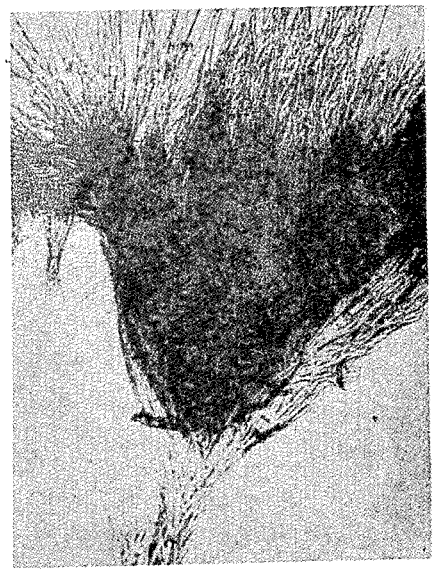
Figure 11:
Figure 12:
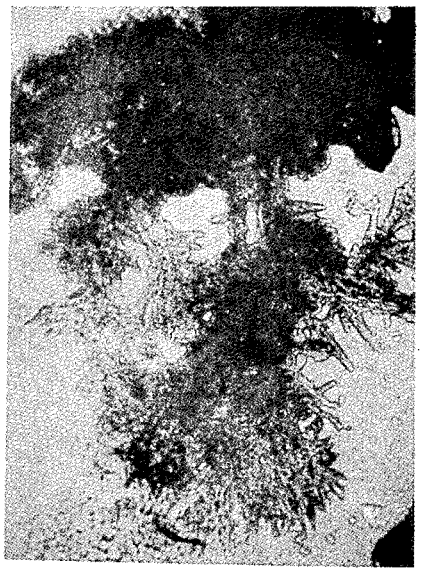

Three characteristic crystal forms from water-extract of commercial superphosphate treated by ammonium molybdate are shown in FIGURES 10, 11, and 12.

Figure 13:
Figure 14:
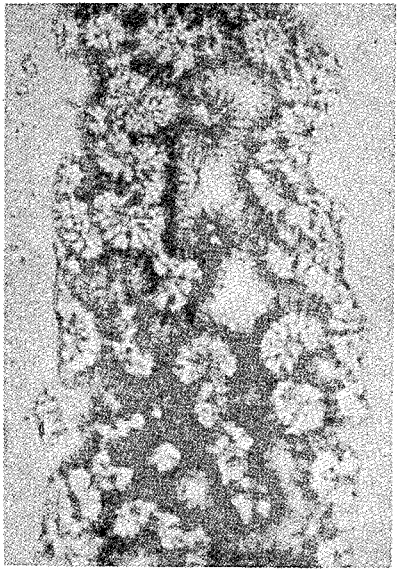
Figure 15:

A prepared laboratory standard comprising crystals formed by treatment of a water-extract of a crystal of monocalcium phosphate and dicalcium phosphate on the one hand and pyrophosphate on the other hand in a ratio of the order of 4 to 1 by ammonium molybdate are shown in FIGURES 13, 14 and 15. These three figures as a group are comparable with FIGURES 10, 11 and 12. Each of FIGURES 13, 14 and 15 can well be compared with the corresponding figure to its left.

This standard shows the same three characteristic crystalline habits as commercial superphosphate treated by ammonium molybdate and illustrated in FIGURES 10, 11 and 12.

In FIGURE 10 a clustered formation of finely acicular anisotropic crystals in two stages of their habit exhibit different although closely related forms. When as here the cluster is predominately extended in one direction the effect is typical.

FIGURE 11, taken from the same specimen as FIGURE 10, exhibits the second stage of this habit. In the lower part of this figure immediately left of a vertical center line a comparatively large dark void object is surrounded by smaller similar ovoids visible only by their irregular dark outlines. In the right half are other similar objects some dark and some lightly outlined. All are more or less densely compacted spheroidal clusters of the same anisotropic acicular crystal. These crystals are so highly refringent that when the density of the compacted group exceeds a critical point light is so widely scattered that the needle cluster appears dark. A lighter degree of compacting shows this effect only at the termini of the individual crystals thus forming the irregular dark outline.

In the upper left portion of FIGURE 11 occurs a stout limbed branching crystal which is isotropic though the inclusion of minute anisotropic fragments may momentarily confuse an observer.

FIGURE 12 is a second and larger group of this same stout branched material. All these three illustrations come from the same physical specimen.

FIGURES 13, 14 and 15 show three crystal habits obtained from a single physical specimen of the standard solution consisting of an aqueous extract of a mixture of four parts of chemically pure calcium monophosphate and one part of a mixture of equal parts of chemically pure dicalcium phosphate and chemically pure calcium pyrophosphate which has been described above.

FIGURE 13 shows the first stage of the acicular anisotropic crystals in their unidirectional extension forming a definite feather pattern. The similarity between FIGURES 13 and 10 is as expected in two crystals of the same specimen. FIGURE 14 corresponds to the ovoid clusters of FIGURE 11. In FIGURE 14 the cluster nuclei have been brought into an aggregate through the drying of the solution upon a surface slightly water repellant. FIGURE 14 shows the individual needle structure more clearly than does FIGURE 11 and the tendency of the extremity of the individual needles to disperse sufficient light to appear dark. Therefore most of the clusters in FIGURE 14 compare most closely with the outline clusters of FIGURE 11.

FIGURE 15 is a typical group of the stout branching isotropic crystals which are seen in FIGURE 12 and to a lesser extent in FIGURE 11.

Instead of having a single pair of corresponding crystals in these two specimens we have three highly characteristic crystal habits in the superphosphate extract and three highly characteristic crystal habits in the mixture of dicalcium phosphate, calcium pyrophosphate and monophosphate and the three in the one case are crystallographically identic respectively with the three in the other.

The similarity between FIGURES 8 and 9 is clear to any trained crystallographer, as is also the close similarity between FIGURES 10 and 13; 11 and 14; and 12 and 15. FIGURES 24 to 27 both inclusive show the macroscopic appearance of the four substances which form the basis of FIGURES 8 to 15 both inclusive.

Figure 16:
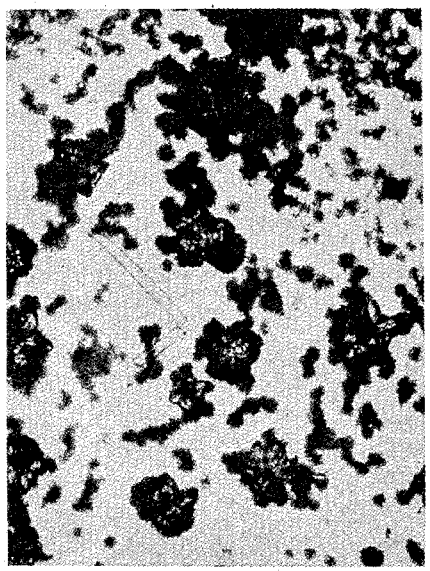

FIGURE 16 shows a crystal formation of a water-extract of the typical superphosphate treated by hexamine cobaltic chloride. The base of the field is made up of comparatively anisotropic colorless fusiform crystals, singly, in pairs, radiates and sheaves. Interspersed through this background are typical deformed hexagonal crystals of a distinct yellow color. These crystals are anisotropic and with low birefringence and are secondary and tertiary developments of hexagonal rosettes. The colorless crystals when grouped in sheaves and larger aggregates are so highly refractive that they scatter light outside the microscopic field giving them the appearance of dull opaque solids of irregular shape.

Figure 17:
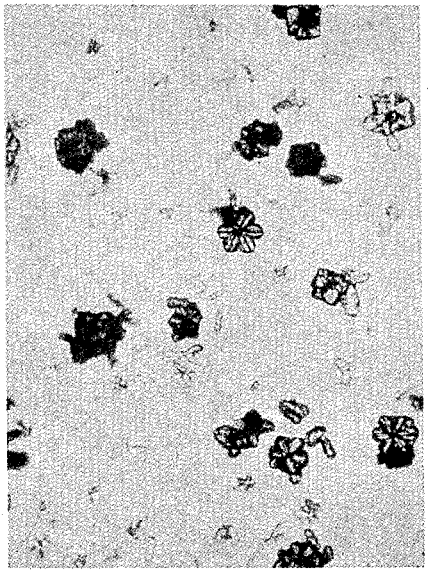

FIGURE 17 illustrates a standard prepared from an extract of a mixture of monocalcium phosphate and calcium hypophosphite treated by hexamine cobaltic chloride. The form of this crystal is less complex than that of FIGURE 16 but exhibits the same fundamental characteristics. The fusiform crystals of the background are not developed to the same degree as those of FIGURE 16 since they remain largely single, double and simple radiates. The yellow hexagonal rosettes display their fundamental form more distinctly than do those of FIGURE 16. Both of these fields, however, illustrate two different stages of development of practically speaking identic crystalline habit.

Figure 18:
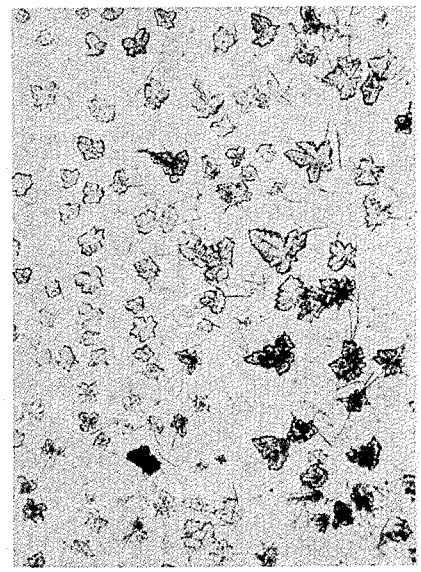

FIGURE 18 illustrates a standard made of a mixture of conventional superphosphate treated with hexamine cobaltic chloride. The background is made up of minute granular crystals which gradually increase in size until they form the roughly trigonal center around which the typical crystal is built. This crystal does not exhibit a definite trigonal formation. It starts with a trigonal form which develops asymmetrically into an irregular leaf-shaped crystal with 3, 4 or 5 major limbs, hardly any worms suggestion a hexagonal symmetry. As these crystals increase in size one arm develops considerably at the expense of the others and near one and two arms at 90 degrees and almost equal in size appear. A very short arm which appears to be a continuation of the long arm completes the definite cross or dagger-shape of this typical crystal. Neither in background nor principle does this crystal resemble that of FIGURES 16 and 27.

Figure 19:
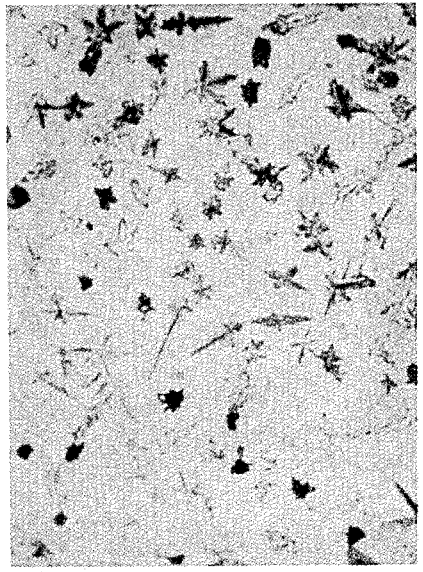

FIGURE 19, from a prepared standard formed by said mixture of monocalcium and pyrophosphate and dicalcium phosphate treated by hexamine cobaltic chloride, is characterized by irregular leaf-shaped crystals and also isometric leaf forms similuar to those in FIGURE 18 as well as a similar birefringence. The typical crystal of this group, however, is a dagger-shaped crystal much more highly developed than the crystals of FIGURE 18.

The four specimens illustrated in FIGURES 16, 17, 18 and 19 treated with hexamine cobaltic chloride divide sharply into two groups of two substances. The standard formed from a mixture of monocalcium orthophosphate and calcium hypophosphite exhibits characteristics similar to those of the product while crystallographers can see an unmistakable relation between mixtures of monocalcium and dicalcium orthophosphate and pyrophosphate and that of conventional superphosephate.

This case is typical of those often found in crystallographical analysis in which the superficial appearance of two specimens would lead a layman to assume that the materials are entirely different. To the crystallographer, however, the daggers, crosses and radiates so typically illustrated in FIGURE 19 are merely skeletons of crystals. When filled out by the growing crystal these skeletons assume the appearance shown in FIGURE 18. There are no less than four distinct skeletal types in FIGURE 19, all of which more highly developed clearly appear in FIGURE 18.

In the set shown by FIGURES 20, 21, 22 and 23, crystals from the same water-extracts as in the foregoing group were treated with ammonium chloride.

Figure 20:
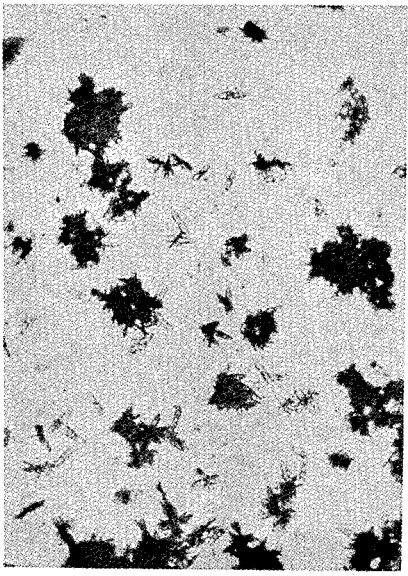
Figure 22:

In FIGURE 20 the entire specimen, of the characteristic superphosphate, exhibits small fusiform crystals, which except for grouping in clusters have definite and uniform appearance, in singles, doubles, simple radiates, and clusters. The individual crystals are laminate and anisotropic. The clusters are so reflective that by plain (non-polarized) light they appear opaque rough and irregular but under polarized light are seen to be complex aggregates of the crystal which characterizes the body of the specimen.

Figure 21:
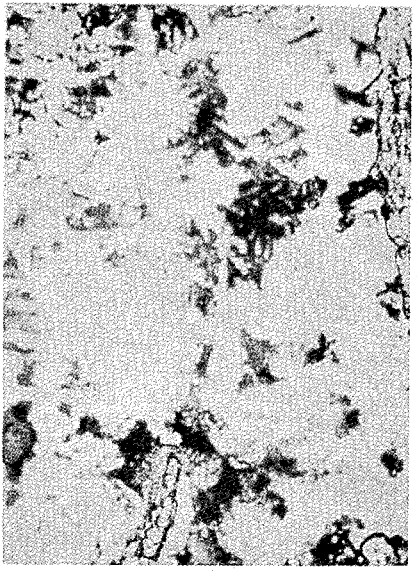

FIGURE 21 is a standard of a crystal formation of monocalcium phosphate and calcium hypophosphite of a ratio of the order of 2 to 5 treated with ammonium chloride. This material exhibits the highly refractile rough crystal of the reagent interspersed with translucent opaque clumps which upon examination with polarized light show as clusters of anisotropic crystals. These crystals are more definitely rhomboid than the fusiform crystal of FIGURE 20 and the individual crystals are considerably smaller. Both of these conditions, however, indicate merely alternate habits of the same material since their crystallographic identity and habit of grouping are the same and the scattering of the minute single and double crystals about the clusters is common to both.

FIFGURE 22 illustrates a distinctive crystal formation of conventional superphosphate treated with ammonium chloride. Upon a background of square plates is superimposed the typical ladder crystal which consists of broad irregularly swollen limbs with primary, secondary and tertiary branches all leaving the parent stem substantially at right angles with occasional deviations of ten or fifteen degrees. This crystal is isotropic. Entwined with it is a segmented linear crystal growth which branches at acute angles and is strongly anisotropic.

Figure 23:

FIGURE 23 illustrates a standard formed of said mixture of monocalcium and dicalcium phosphate and pyrophosphate treated by ammonium chloride. This preparation exhibits the typical square branch habit of the crystal of FIGURE 22 and from the standpoint of scientific crystallography is identic except that it lacks the rectangular background crystals of FIGURE 22. Since differences in size and formation are a characteristic of temperature and humidity of the evaporating atmosphere and the concentration of the solution it has no bearing upon identity.

Ammonium chloride is a highly active compound in crystallization. Because of the intricacy of the crystal pattern and the rapidity with which it forms, it is somewhat more sensitive to minute changes of environment than are other reagents. This characteristic gives rise to a great number of minor differences in crystal habit, caused by minute differences in environment during the process of crystallization. Nevertheless the marked similarity between FIGURES 20 and 21 in one case and between 22 and 23 in the other is unmistakable. This similarity, confirming the results obtained with two other reagents, emphasizes the close chemical relation existing between the average conventional superphosphate and a mixture of pyrophosphate and orthophosphate.

FIGURES 8 to 15 both inclusive should be considered in connection with FIGURES 24 to 27 both inclusive. These latter figures illustrate the macroscopic appearance of the four water-extractions presented in detail in the above figures.

Figure 25:
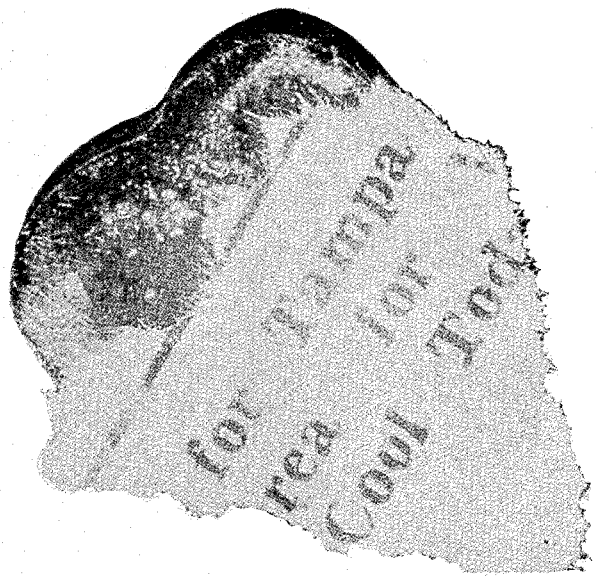
FIGURES 24 to 27 illustrate the macroscopic appearance of the four prepared standard water-extracts which are presented in detail in photomicrographs in FIGURES 8 to 23 inclusive.
Figure 24:
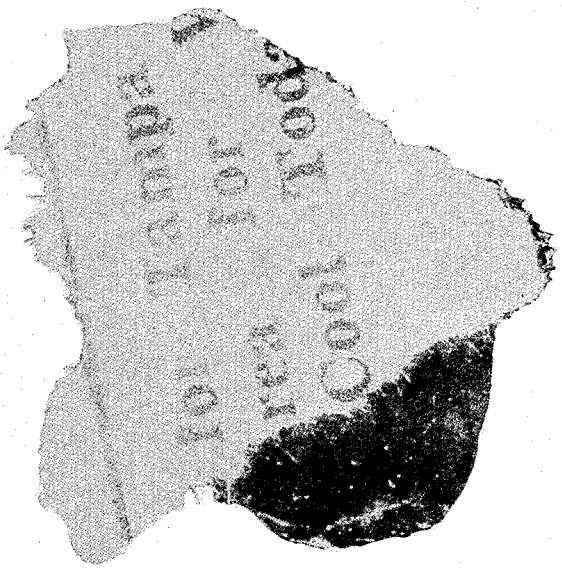

FIGURE 24 shows the superphosphate treated by ammonium molydate and corresponds to and should be considered with FIGURE 8. FIGURE 25 is a prepared standard of a mixture of monocalcium phosphate and calcium hypophosphite in the same ratio as that stated for FIGURE 9 and likewise treated by ammonium molybdate and corresponds to FIGURE 9.

These specimens of FIGURES 24 and 25 are so transparent and nearly colorless that a fragment of newspaper placed beneath the dry deposite shows its density and at a glance the close similarity of composition between the two. The macroscopic composition of these specimens has been described hereinabove.

Figure 27:
Figure 26:

FIGURE 26 shows the dry residue from a water-extract of conventional superphosphate and FIGURE 27 a similar residue of a standard of monocalcium and dicalcium phosphate and pyrophosphate both after treatment by ammonium molybdate. FIGURE 26 corresponds to FIGURES 10, 11 and 12. FIGURE 27 corresponds to FIGURES 13, 14 and 15. Both are characterized by a white and opaque body color and granular and branching crystallization. Although the formations of FIGURES 26 and 27 have many characteristics in common, they have nothing in common with those of FIGURES 24 and 25. See also FIGURES 8 to 23 and the previous description thereof.

DESCRIPTION OF PRODUCT

The above crystallographic description and definitions herein identify the superphosphate only since the addition of other fertilizer materials produce other chemical compounds and consequently entirely changes the appearance of the crystals. Also, the addition to the characteristic product even in small quantities of other forms of phosphorus, e.g. a metaphosphate or a pyrophosphate, produces a different crystal.

The characteristic product is a compound of calcium and phosphorus which was previously unknown and has not been utilized in the fertilizer or other useful art and to which consequently a name has not been applied, a condition which is not unusual with phosphatic compounds. The identity of the characteristic product, however, has been fully and specifically established inasmuch as it is possible to re-produce it at will from familiar and standard phosphatic compounds. When monocalcium phosphate (reagent) and calcium hypophosphite (National Formulary) is mixed in the proportions of about two to five a product is obtained which meets the above crystallographic tests, which furnish the most exact identification of a radical known to the inventor in the same way as the characteristic product. Many thousands of chemical, electro-chemical and optical determinations confirm the above crystallographic conclusions. Therefore the characteristic product is one which can be recovered from a solution containing the characteristic ions of monocalcium phosphate and calcium hypophosphite.

The name applied to the substance characteristic of the product is not important since it has been completely identified and exactly set forth by a plurality of methods for its manufacture. There is indication of the presence in the product of a compound which is produced during manufacture by the interaction of calcium hypophosphite and calcium monophosphate. It is a phosphatic salt which is water-soluble and contains one or more replaceable hydrogen atoms, and in standard laboratory tests reacts in the same way as known standard solutions prepared as above.

Therefore, for all practical purposes of identification, the characteristic product may be defined as a persistent acidic salt with one or more replaceable hydrogen atoms embodying the characteristics of a compound of hypophosphite and monophosphate. Because the characteristic properties of the product in many ways closely resemble hypophosphite and inasmuch as the characteristic product has as yet no specific chemical name the terms "hypophosphites," "hypophosphatic" and similar terms have been used to designate these characteristic properties but it is to be understood that it is not thereby indicated that the product is actually calcium hypophosphite as an independently existing compound. A water solution of the characteristic product subjected to routine procedures of conventional chemical analysis discloses among other radicals that typical of hypophosphite, which of course can and does combine with any base, such as calcium.

Conventional processes of superphosphate manufacture, unlike that of the invention, foster the taking on of additional oxygen because the heat and moisture of the conventional pile, air blasts, high heat and the like, all of which are avoided, are oxidizing agencies.

While the actual sal present in the superphosphate (before it is mixed with other fertilizing materials) is largely the calcium salt, these fundamentals apply equally to most other cations and account for an important superiority of the product. In the superphosphate in admixture with other fertilizer materials, the ion of the characteristic salt persists but the calcium cation is replaced by that of the added material, e.g. ammonia or potash. The calcium cation of the earlier product joins the ion of the other material, in many instances forming a substance of a greater degree of water-solubility than that previously known therefrom.

A trace of a product similar to that of the invention appears in conventional superphosphate and in products made therefrom, although in varying degrees which are greater in uncured superphosphates such as run-of-pile not intended for direct sale to and use by a farmer. Such trace substances occur because accidentally previous practitioners have failed to dehydrate completely or to heat excessively a portion of their product. Therefore in the product claims hereof a substance similar to the above in a quantity not exceeding the order of five percent of the total phosphatic (or if pertinent) metallic component thereof which is water-extractable is excluded.

The presence of the characteristic substance tends to render the entire complex truly water-soluble generally but not always up to the measure of the water-extractability of the compound. While probably slightly less than one-third of a water-extract of the product comes from this salt as defined above, its presence renders the remainder water-extractable phosphatic complex truly water-soluble in whole or in part.

An important characteristic of the product is the presence therein of water-soluble calcium to an amount materially greater than that for which water-soluble calcium phosphate can be responsible. Water-soluble sulphur is also present in an amount indicating that both calcium and sulphur come from water-soluble calcium sulphate. These amounts materially exceed 1½% to 2% of the calcium sulphate present, the largest amount in any conventional product known to the inventor.

HEAT, COOLING AND MOISTURE

From the foregoing portion of this specification it will have been evident that the three factors of heat, cooling and moisture are vital to the practice of the invention. Acids are employed which are sufficient in quantity and concentration to react with substantially all of the ground phosphate rock use to furnish the water of crystallization necessary for the typical product, together with the relatively slight amount lost by evaporation, but without a surplus which results in a gummy or sticky product. An initial high temperature over a brief period is not deleterious and may be helpful but it is essential that thereafter temperature and heat decrease substantially consistently and quickly. When an ionized solution contains constituents which may be grouped into one or two or more different forms, as is true in the acidulation of phosphate rock, that form which is recovered depends upon environment of recovery and particularly upon temperature and humidity, both of which are reflected in the rate of recovery by evaporation. In the manufacture of the product the resulting chemical crystal is made up not only of the constituents coming from the original mass but also includes a necessary amount of water which becomes a part of the resulting solid crystal which thereupon loses all physical evidence of "wetness."

The process which results in the product hereof diverges from the conventional after the mixing and discharge of rock and acid. As soon as the material is removed from the den, or in the ventilated car method, from the mixer the temperature is prevented from rising except relatively slightly and momentarily. Thereafter it cools consistently. The use of the relatively critical ratio of acid to rock is combined with means which provide relatively long crystallization at low temperature. This crystallization is merely a first step in the cure. In conventional processes and in this process, after an initial period of high temperature, disintegration provides a sharp drop in temperature. Under conventional practice almost immediately thereafter the temperature of the mass rises rapidly while with the instant processes, whether there is positive ventilation as provided herein or pelleting and coating as in the parent patent the period of initial crystallization is much prolonged, although it is measured only in a few hours at most. Without reheating the mean temperature of the mass of superphosphate cools to 170° or thereabouts within say 24 hours. During the corresponding portion of the period after ex-denning the temperature of superphosphate as conventionally handled increases rapidly and while it may be reduced from time to time as by repiling its characteristic crystal, in the scientific not the popular sense, is formed almost immediately, presumably in a matter of minutes or fractions thereof, under high heat and obviously while ionized. In known processes, formation of the instant substance is prevented by the absence of the necessary moisture.

An ionized solution of the product loses its characteristic quality when subjected to a temperature of 160° and when recrystallized a portion thereof resembles that of conventional superphosphate. Disintegration of the mass of the superphophate at a slightly higher temperature, say 170°, rapidly cools it to 160°. It is only when the compound after its formation is ionized that this temperature of 160° is critical. When formed as a solid salt it does not give up its water of crystallization until much higher temperatures are reached. This latter characteristic is commonly encountered by chemists in crystalline recovery.

The statements that the free moisture and the water of crystallization is retained in the end product substantially all of the moisture which was present at ex-denning does not mean that what is ordinarily thought of as "water" (something which is wet) is present at all, but that the H and OH ions are preserved in the crystal. A fundamental characteristic of the process is that it retains water which is available and used for recrystallization and the drying of the product, whether pelleted or fine, by internal action—from the inside out and not from the outside in.

Beyond the range of temperatures found in actual use obviously the crystal, like almost every other crystal known to science, gives up its moisture on drying. This fact and additional proof of the essential difference in kind between the product of the invention and the conventional is given by the following table which shows loss of moisture on drying at certain specific temperatures stated in degrees centigrade:

| Temperature, degrees | Sample A hereof percent | Sample B hereof percent | Conventional Sample A, percent | Conventional Sample B percent |
|---|---|---|---|---|
| 110 | 12.16 | 12.07 | 13.92 | 14.02 |
| 180 | 5.59 | 5.60 | 2.69 | 2.81 |
| 250 | 0.66 | 0.71 | 1.71 | 1.20 |
| 350 | 1.53 | 1.52 | 2.32 | 2.33 |
| 430 | 0.68 | 0.71 | 1.02 | 1.07 |
|  | 20.62 | 20.61 | 21.26 | 21.43 |

THE ROLE OF METALS

Many soils are deficient in calcium in a utilizable form. Calcium materially assists in rendering other plant foods usable. Sulphur also is necessary in certain soils. Water-soluble calcium and sulphur in combination do not change the acid-alkaline balance of the soil. The product furnishes both.

The novel product promotes the solubility of iron, aluminum, and other metallic salts valuable to plant growth, thus rendering these substances more readily available for plant utilization. This is probably attributable to the peculiar phosphate radicals which are released in the soil by the product, and in addition, to the readily available hydrogen ions in high concentration which appear whenever the product is dissolved. Furthermore, because of the novel chemical constitution of the product, it contains many times more water-soluble and available iron, than conventional superphosphate. Similar solubility effects are achieved with other metals, such as, for example, aluminum, manganese, zinc, and copper. This is in contrast to conventional phosphatic fertilizers, where the predominant tendency is for such metals to react to an insoluble form in both the fertilizer itself and in the soil.

Many rocks have been considered incapable of utilization provided iron and aluminum therein, considered as sesquioxides, have exceeded 3%. Previously the use of rocks containing iron or aluminum has required additional acid for acidulation. Such rocks are used and from the metals therein secure in usable form constitutents of great value to the plant and with the use of less acid than is conventional.

DEFINITIONS

Hereinbefore and in the claims the term "dry" is used (as adjective, verb, and noun) as meaning sensibly dry or chemically dry and not as indicating a result of any dehydrating operation by driving off moisture. The "drying" does not cause a loss of total water but the disappearance to the senses of the moisture which would otherwise be apparent. The preservation and optimum use of water, not its dissipation, are chief objects of this invention.

When expressions referencing the concentration of the acid and the moisture in the ground rock and acid as mixed are "just sufficient" for stated purposes, and the use of like expressions are used, it is meant that within the tolerance usual to mass production of chemicals for commercial use, not laboratory standards.

"Primary period" is an expression employed by fertilizer chemists to apply to the immediate reaction of acid and rock beginning in the mixer and if a conventional den is employed including the period of reaction extending until ex-denning.

"Secondary period" means that following the primary period, while chemical activity continues on at least a moderate scale, as the curing progresses.

In those claims in which mention of temperatures is made during the secondary curing period the mean temperature of the entire pile is referred to.

Claims to and descriptions of a "cured" product or the "curing" of one should be read with the following explanation. A literal cure from a laboratory standpoint takes an indefinite period and is beyond a commercial operation. The use of such terms refers to the development of the reactions to a point at which chemical action has largely ceased, although a small amount will long continue to a slowly diminishing extent. Such terms are not used to indicate merely development to a point of apparent or actual dryness which permits mechanical handling.

I use all terms with the exact meanings which I have defined above and not as previously inconsistently and loosely used.

The advantages of this invention, as well as its characteristics and objects, will be evident from the foregoing specification, the attached drawings and the subjoined claims.

What is claimed is:

1. A process of manufacturing superphosphate which comprises mixing phosphate rock and a strong inorganic acid, pouring said mixture into a den, removing the superphosphate from the den at the substantial completion of the primary reaction and disintegrating it, placing a plurality of ventilating tubes spaced from said den, piling the disintegrated superphosphate about said tubes, and leaving said superphosphate in said ventilated pile and removing the exothermic heat of the secondary reaction during said secondary reaction with minimal loss of moisture and until it has cured.

2. In a process of manufacturing mixed fertilizer which contains superphosphate and other fertilizer ingredients, the steps of mixing superphosphate fertilizer which has passed through a substantial portion of its reactions but is still chemically active, and said other ingredients, such mixture producing exothermic heat, providing a plurality of ventilating tubes spaced from each other and of such number and size as to carry off said exothermic heat relatively rapidly so that the temperature decreases substantially consistently, piling said mixture about said tubes, thereby avoiding reheating with consequent substantial loss of the moisture present in the mixture when piled, said mixture thereupon surrounding a substantial portion of said tubes, and leaving said mixture in such ventilated pile until such reaction has been substantially completed.

3. A process of manufacturing superphosphate which comprises mixing phosphate rock and a strong inorganic acid, placing such mixture in a den, after the substantial completion of the primary reaction removing the fresh superphosphate from the den and disintegrating it, piling the disintegrated superphosphate in a relatively large pile spaced from the den, and forming ventilating openings which extend substantially throughout the pile and are of sufficient number and size to carry off the heat of the secondary reaction generated after such piling as fast as it is generated thereby preventing the superphosphate in the pile from reheating and losing a substantial amount of the moisture present when the mass was piled.

4. A process of manufacturing superphosphate which comprises mixing phosphate rock and a strong inorganic acid, pouring said mixture into a den, removing the superphosphate from the den before the exothermic reaction is complete and while the superphosphate is still capable of autogenous rise in temperature and an exothermic secondary reaction and disintegrating it, placing a plurality of ventilating tubes spaced from said den, the number and position of said tubes being such that heat formed by the secondary reaction is carried off from disintegrated superphosphate piled about said tubes so rapidly that the temperature of disintegrated superphosphate piled about said tubes decreases substantially continuously, piling the disintegrated superphosphate about said tubes, and leaving said superphosphate in said ventilated pile until it has cooled, with minimal loss of moisture, to substantially atmospheric temperature.

5. The process of claim 4 in which said tubes are placed upright, after said pile is placed similarly forming and then disintegrating other mixtures of rock and acid, piling said disintegrated mixtures on top of the disintegrated superphosphate previously piled, moving said tubes upwardly to a position wherein the upper portion of each extends above the mass of previously piled disintegrated superphosphate but the lower portion of each thereof is held firmly by the superphosphate previously piled thereabout, with the tube and the opening in the pile cast about the tube in the space formerly occupied by the tube forming a continuous ventilating passage.

6. The process of claim 4 in which said tubes are placed in an upright position, each of said tubes being positioned between approximately three and five feet from the others thereof.

7. The process of claim 4 in which said tubes are upright with both ends of each thereof in communication with the atmosphere.

8. A process of manufacturing superphosphate which comprises mixing phosphate rock and a strong inorganic acid, pouring said mixture into a den wherein it forms a layer of a thickness of between three inches and three feet thereby increasing the heat of the mass above that obtaining at the time it was poured, after the superphosphate has set and at the substantial conclusion of the primary reaction removing it from the den and disintegrating it, placing the superphosphate in a relatively large pile spaced from the den, forming a plurality of spaced continuous passages extending a substantial distance through the interior of the pile so that the temperature of the mass after piling caused by the heat of the secondary reaction continuously decreases, the relatively large size of the pile preventing an over-rapid decrease of the temperature of the exterior portion of the pile, and leaving the pile untouched until the temperature thereof has reached that of the atmosphere, with minimal loss of moisture.

9. A process of manufacturing superphosphate in which at least substantially eighty-five percent of the available phosphoric acid is in water-extractable form which comprises; mixing phosphate rock and a strong inorganic acid; the concentration of the acid and the moisture in the mixture of ground rock and acid being just sufficient to provide the amount of water lost by evaporation, the water of crystallization of the product and to produce a sensibly dry product and the acid being of a type which in such a mixture causes heating during curing; pouring the mixture into a den, removing the material from the den at the substantial conclusion of the primary period; and placing the material in a pile which is formed with a plurality of spaced continuous passages extending a substantial distance through the interior of the pile through which air passes so that from the time of piling during the secondary reaction the heat of the mass continuously decreases with minimal loss of moisture from evaporation until it reaches at least approximately 100 degrees Fahrenheit.

10. A process of manufacturing superphosphate which comprises mixing phosphate rock and a strong inorganic acid, pouring a succession of such mixtures to form a single homogeneous unitary block, as said mixtures are poured ventilating openings being formed and extending substantially throughout the interior of said unitary block, said ventilating openings being of such size and location that after the primary reaction said block cools by convection to approximately 170 degrees Fahrenheit within twenty-four hours, with avoidance of all but minimal evaporation of moisture and leaving said block without disintegration and said ventilating openings effective for ventilation until the block has cooled to atmospheric temperature.

11. A process of manufacturing superphosphate which comprises mixing phosphate rock and a strong inorganic acid, pouring said mixture to form a single homogeneous block, spaced passageways for currents of air being formed through the interior of said block and extending to the exterior thereof and of sufficient air-capacity at atmospheric pressure to carry off by convection the heat of the secondary reaction as fast as it is produced with minimal loss of moisture, and leaving said unitary block intact and at atmospheric pressure until it has cooled to below 170 degrees Fahrenheit.

12. A process of manufacturing superphosphate which comprises placing a plurality of pipes extending throughout the interior of an enclosure and to the exterior thereof, mixing phosphate rock and a strong inorganic acid, and pouring batches of said mixture each of an amount sufficient to form a single homogeneous layer within said enclosure and about said pipes of not less than three inches or more than three feet in thickness, the number and position of said pipes being such as to provide an amount of ventilation by convection at atmospheric pressure during the primary period immediately after pouring when heat is being generated very rapidly so that there is insufficient ventilation to lower the temperature and that during the secondary period when heat is being generated relatively slowly it is dissipated with minimal loss of moisture, and controlling said ventilation to maintain an elevated temperature during said primary period and to provide a lowering of the temperature during said secondary period.

13. A process of manufacturing superphosphate which comprises: mixing phosphate rock and an inorganic acid selected from the group consisting of sulphuric acid and phosphoric acid and mixtures thereof; placing said mixture of rock and acid in a pile of substantial size having a plurality of spaced continuous passages extending a substantial distance through the interior of the pile; after the substantial completion of the primary reaction, by convection at atmospheric pressure removing heat from said mass to prevent consistent rise in temperature from the time said mixture is so placed and to cause relatively rapid cooling; and leaving said superphosphate in said pile until it has cooled to below about 170 degrees Fahrenheit; the concentration of the acid and the moisture in the mixture of ground rock and acid being just sufficient to provide the amount of water lost by evaporation, the water of crystallization of the product and to produce a sensibly dry product.

14. A process of manufacturing a fertilizer product comprising mixing ground phosphate rock with a concentrated inorganic acid selected from the group consisting of sulphuric acid and phosphoric acid and mixtures of phosphoric acid with sulphuric acid, after substantial completion of the primary reaction forming the mixed material into a pile having a plurality of spaced continuous passages extending a substantial distance through the interior of the pile, removing heat from said pile so that the temperature thereof consistently decreases without dehydration, curing said material, and recovering a fertilizer product characterized by the presence of a major portion of a substance recrystallizable from a water-extract, the re-crystallized substance being crystallographically identical with the re-crystallized substance obtained from a solution of a mixture of two parts by weight of calcium hypophosphite and five parts by weight of calcium monophosphate.

15. A process of manufacturing a fertilizer product comprising mixing ground phosphate rock with concentrated sulphuric acid, after substantial completion of the primary reaction forming the mixed material into a pile having a plurality of spaced continuous passages extending a substantial distance through the interior of the pile, removing heat from said pile with minimal loss of moisture, until said material has cured, and recovering a fertilizer product characterized by the presence of a major portion of a substance re-crystallizable from a water-extract, the re-crystallized product being crystallographically identical with the re-crystallized substance obtained from a solution of a mixture of two parts by weight of calcium hypophosphite and five parts by weight of calcium monophosphate, where the concentration of the acid and the moisture in the ground rock and acid as mixed are just sufficient to provide the amount of water lost by evaporation, the water of crystallization of the product and to produce a sensibly dry product.

References Cited in the file of this patent

UNITED STATES PATENTS

| Number | Name | Date |
|---|---|---|
| 825,532 | Green | July 10, 1906 |
| 1,286,562 | Doles | Dec. 3, 1918 |
| 1,383,912 | Doyle | July 5, 1921 |
| 1,398,816 | Tuttle | Nov. 29, 1921 |
| 1,604,359 | Larison | Oct. 26, 1926 |
| 1,761,991 | Ober | June 3, 1930 |
| 1,837,305 | Wight et al. | Dec. 22, 1931 |
| 1,985,810 | Hyatt et al. | Dec. 25, 1934 |
| 2,061,567 | Facer | Nov. 24, 1936 |
| 2,095,993 | MacIntire | Oct. 19, 1937 |
| 2,213,243 | Facer | Sept. 3, 1940 |
| 2,248,514 | Shoeld | July 8, 1941 |
| 2,601,728 | Erfurth | July 1, 1952 |